United States Patent [19]

Tattersall et al.

[11] 4,428,448
[45] Jan. 31, 1984

[54] FLUID-CUSHION SUPPORTED APPARATUS

[75] Inventors: Edward G. Tattersall; Anthony J. English, both of Southampton, England

[73] Assignee: Vosper Hovermarine Limited, England

[21] Appl. No.: 352,303

[22] Filed: Feb. 25, 1982

[30] Foreign Application Priority Data

Mar. 13, 1981 [GB] United Kingdom ............... 8107935

[51] Int. Cl.³ .............................................. B60V 1/16
[52] U.S. Cl. .................................. 180/128; 114/67 A; 180/121; 180/127
[58] Field of Search .............. 180/128, 120, 126, 127, 180/116; 114/67 A; D12/5

[56] References Cited

U.S. PATENT DOCUMENTS

| | | | |
|---|---|---|---|
| 3,409,103 | 11/1968 | Tripp | 180/120 X |
| 3,621,932 | 11/1971 | Tattersall et al. | 180/126 |
| 3,643,758 | 2/1972 | Winter | 180/128 |
| 3,907,061 | 9/1975 | Chapman et al. | 180/120 |

FOREIGN PATENT DOCUMENTS

| | | | |
|---|---|---|---|
| 1272738 | 7/1968 | Fed. Rep. of Germany | 180/128 |
| 1435700 | 5/1976 | United Kingdom | 180/126 |
| 1448390 | 9/1976 | United Kingdom | 180/128 |

*Primary Examiner*—David M. Mitchell
*Assistant Examiner*—Mitchell J. Hill
*Attorney, Agent, or Firm*—Steele, Gould & Fried

[57] ABSTRACT

Fluid-cushion supported apparatus, which may comprise a sidewall gas-cushion vehicle, is supported by a cushion of pressurized air formed and contained between the vehicle body and the surface. The front or bow end of the cushion is contained by an inflatable flexible skirt system comprising a row of ropes or like filamentary support members disposed in spaced, substantially parallel, relationship, with their end portions attached to the vehicle body. Flexible sheet material is draped over the support members so as to form loops extending laterally therebetween. The loops are also curved between the end portions of the support members.

11 Claims, 8 Drawing Figures

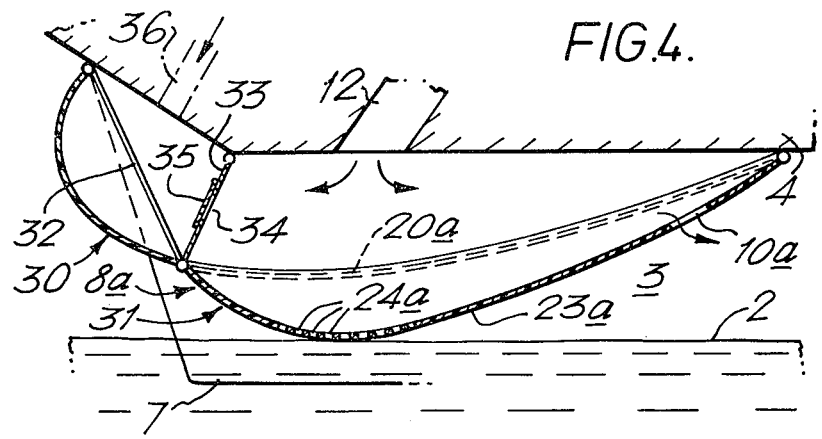
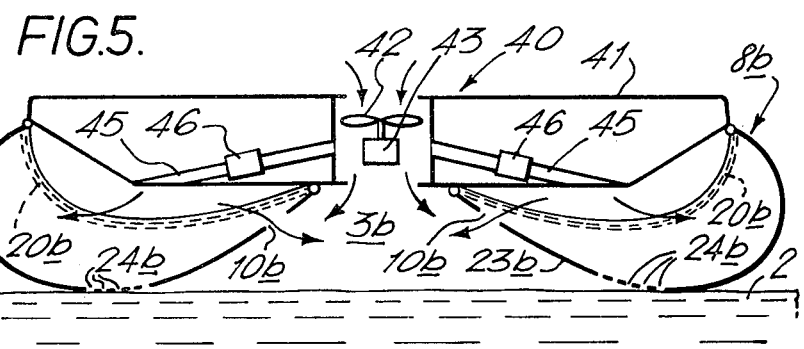
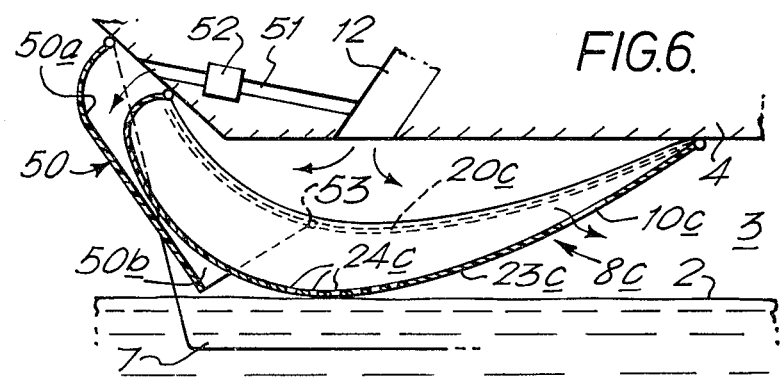

FLUID-CUSHION SUPPORTED APPARATUS

BACKGROUND TO THE INVENTION

This invention relates to fluid-cushion supported apparatus, that is to say, to apparatus which, in operation, is supported, at least in part, by a cushion of pressurised fluid formed and contained between the apparatus and a reactive surface, which may be land or water. One example of gas-cushion apparatus comprises a gas-cushion supported vehicle.

The fluid cushion may be contained, at least in part, by an inflatable flexible skirt system.

Flexible skirt systems comprise two main types, namely segmented or "finger" systems and simple loop or "bag" systems.

The segmented flexible skirt system has been disclosed by British patent specification No. 1,043,351. (U.S. Pat. No. 3,420,330 of Bliss corresponds).

Briefly, this form of flexible skirt system comprises a plurality of contiguous flexible skirt members (or segments) each comprising a sheet of flexible material folded over to provide the member with an outer portion flanked by a pair of side or tie portions, which extend inwardly from the outer portion towards the fluid cushion.

The segmented flexible skirt system is reasonably responsive to variations in reactive surface contour. Thus it is responsive to deflection by waves when used over water. Additionally, the system is reasonably free of shear forces as immediately adjacent flexible skirt members can deflect relative to each other without significant hindrance.

However, segmented flexible skirt systems are prone to wear, due to flagellation at the free bottom ends of the skirt members in the same way as a flag wears out, as well as buckling due to the formation of creases at intermediate points between the upper and lower ends of the skirt members.

The simple loop flexible skirt system has been disclosed by British patent specification No. 1,056,267. (U.S. Pat. No. 3,291,237 of Hopkins et al. corresponds).

Briefly, this system comprises an inflated loop extending between laterally spaced attachment points to present a convex face towards the reactive surface, which face defines a plenum gap with the surface through which fluid surplus to cushion-forming requirements escapes to atmosphere.

The simple loop flexible skirt system tends to have a greater life than that of the segmented system. However, it has substantially less shear freedom, at least in a lateral sense. Furthermore, because it requires large curvatures of loop (imposed by inflation pressure/cushion pressure differentials) in order to maintain system equilibrium and stability, it presents substantial areas of material to the reactive surface whereby frictional resistance is increased.

The present invention provides a fluid-cushion supported apparatus with a flexible skirt system which possesses the advantages of the above-described systems but which can be constructed so as to encounter less frictional resistance than that met by simple loop systems.

SUMMARY OF THE PRESENT INVENTION

According to the present invention, a fluid-cushion supported apparatus is provided with an inflatable flexible skirt system comprising a row of filamentary support members disposed in spaced relationship, with end portions attached to the apparatus, and flexible sheet material supported by and depending from the support members to form loops extending laterally between the support members, the loops being curved between the end portions of the support members.

With the present invention, the curvatures of the loops can be made substantially greater whereby frictional resistance is reduced, relative to that encountered by simple loop flexible skirt systems. This is because the curvatures of the loops depend on the amount of material suspended from the filamentary support members, rather than inflation pressure/cushion pressure differentials.

The present invention is particularly suitable in connection with "sidewall" gas-cushion vehicles. That is to say, gas-cushion vehicles for travelling over the surface of water, wherein, in operation, the sides of each of their vehicle-supporting cushions are contained by a pair of laterally-spaced "side" wall structures extending longitudinally along the sides of the vehicle body in substantially parallel array and depending therefrom so as to dip into the water and form a cushion-gas seal. The flexible skirt system of the invention can be used to contain cushion gas at at least one end of the vehicle.

BRIEF DESCRIPTION OF THE DRAWINGS

An embodiment of the invention will now be described, by way of example only, with reference to the accompanying drawings, wherein:

FIGS. 4, 5, 6, 7 and 8 are fragmentary side views, in medial section, illustrating various modifications.

In the figures, like reference numerals refer to like components and features.

DETAILED DESCRIPTION OF THE PREFERRED EMBODIMENT

Figure 1:
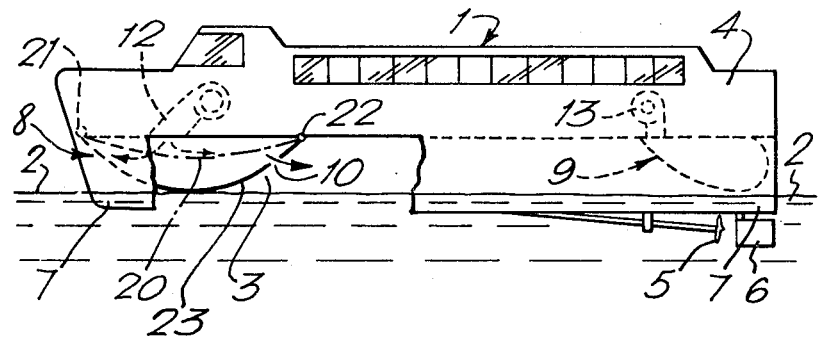
FIG. 1 is a side view of a sidewall gas-cushion vehicle, with sidewall parts removed to show skirt system 8 more clearly.

Referring first to FIG. 1, fluid-cushion supported apparatus in the form of a sidewall gas-cushion vehicle 1 is shown travelling over the surface 2 of water, supported by a cushion 3 of pressurized air formed and contained between the vehicle body 4 and the surface 2. The vehicle 1 is propelled by a pair of water-screw propellers 5 and is steered by a pair of rudders 6.

The sides of the vehicle-supporting cushion 3 are contained by a pair of laterally-spaced sidewall structures 7 extending longitudinally along the sides of the vehicle body 4 in substantially parallel array. The sidewalls 7 depend from the sides of the vehicle body 4 so as to dip into the water and form a cushion seal. Each sidewall 7 carries a water-screw propeller 5 and a rudder 6.

The front or bow end of the cushion 3 is contained by a flexible skirt system 8 and the rear or stern end thereof by a flexible skirt system 9. The skirt systems 8, 9, which are of hollow, inflatable form and constructed from rubberised fabric, extend laterally between the front and rear ends of the sidewalls 7. The skirt systems 8, 9 are demountably attached to the vehicle body 4 and depend therefrom. The bow flexible skirt system 8 is in light contact with the water surface 2. The inflation and tension forces set up in the stern flexible skirt system 9 ensure that it is maintained in light contact with the surface 2.

Air forming the vehicle-supporting cushion 3 is provided by a pair of centrifugal fans 12 disposed side by side. Air from the fans 12 passes through the flexible skirt system 8 to inflate it before entering the space occupied by the cushion 3 by way of outlet ports 10 formed in the skirt system. The rear flexible skirt system 9 is inflated (to a pressure slightly above cushion pressure) by air supplied by a centrifugal fan 13. The fans 12 and fan 13 form separate means for supplying air to the space occupied by the vehicle-supporting cushion 3 and the skirt system 9 respectively.

The rear flexible skirt system 9 comprises a simple loop or "bag" system, and is of the form disclosed by British patent specification No. 1,400,035. (U.S. Pat. No. 3,977,491 of Fishlock corresponds). However, with additional reference now to FIGS. 2 and 3, the front flexible skirt system 8 comprises a row of filamentary support members 20 disposed in spaced, substantially parallel, relationship, with their end portions demountably attached, at points 21 (FIG. 1) and 22 (FIGS. 1 and 2) to the vehicle body 4. Flexible sheet material, (the rubberised fabric referred to above), is draped over the members 20, so as to form loops 23 extending laterally therebetween. The loops 23 form channel-shaped bights or concavities when viewed along their lengths. The bottoms of the loops 23 are curved in this view, the curvature being due to internal inflation forces. The loops 23 are also curved longidutinally, between the end portions of the support members 20, as best shown in FIG. 1.

The bottom of the loops 23 define convex faces in close proximity to the water 2 whereby plenum gaps are formed between the loop bottoms and the water surface, through which an atmosphere-seeking flow of cushion air takes place.

Figure 2:
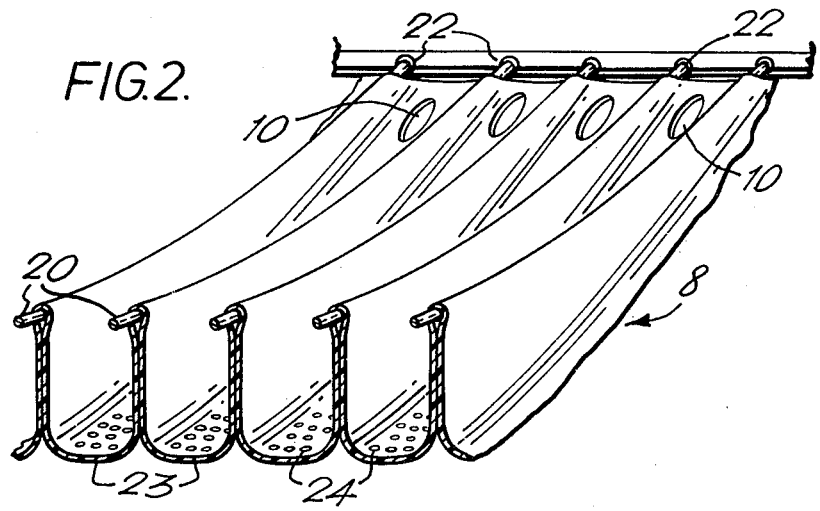
FIG. 2 is an enlarged view, in perspective, of the rear part of the flexible skirt system 8 shown in FIG. 1.
Figure 3:
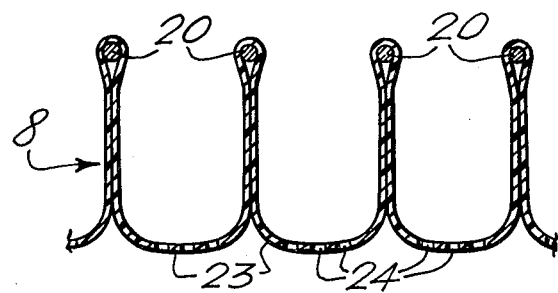
FIG. 3 is a fragmentary front view in section, of the flexible skirt system 8.

As shown in FIGS. 2 and 3, the bottoms of the loops 23 are impermeable except for a multiplicity of bleed holes 24 whereby skirt inflation air bleeds through the holes 24. The escaping inflation air suppresses any tendency for local pressure changes to take place in the atmosphere-seeking flow as a result of the Bernoulli effect. The curvatures of the loops, in a longitudinal sense, are substantially continuous, the bleed holes 24 having no significant effect on the continuation of curvature.

Drain holes may be provided as an alternative to the bleed holes 24.

Blocks of buoyant material may be attached to the inner surfaces of the loops 23, so as to give the flexible skirt system 8 buoyancy when the vehicle 1 is "off-cushion" and resting on the water surface 2.

The filamentary support members 20 preferably comprise wires, ropes or bungees. Combined inflation and tension forces maintain the bottoms of the loops 23 in contiguous relationship with the water surface 2 with the support members 20 in tension. If the water surface 2 rises relative to the loop bottoms, tension in the support members 20 is reduced whereby the loops 23 are moved upwardly to restore the contiguous relationship with the water surface.

In operation, skirt inflation forces tend to urge the contiguous side portions of the loops 23 together so as to maintain a cushion air seal. Inflation loads acting substantially normal to the bottom or middle portions of the loops 23 are transferred to the vehicle body 4 by way of the support members 20.

It will be appreciated that the loops 23 are free to deflect relative to each other by a substantial amount whereby the flexible skirt system 8 is free from any significant shear force. A skirt system with a high level of response to variations in water surface 2 contour is thus provided.

If it is desired that the flexible skirt system 8 should project beyond the front or bow ends of the sidewalls 7 to any substantial degree, (the projection being curved when viewed from above), the filamentary support members 20 may need to be disposed in a non-parallel manner. Any gaps existing between the sides of the skirt system 8 and inner surfaces of the sidewalls 7 can then be closed by suitable shaping of these inner surfaces and/or the provision of inflatable bag-like seals disposed between the system 8 and sidewalls 7.

FIGS. 4 to 8 illustrate various modifications.

In FIG. 4, a flexible skirt system 8a is shown which is of two-stage form, comprising an upper stage 30 and a lower stage 31. The forward ends of members 20a are attached to the vehicle body 4 by way of tie cords 32 and a laterally-extending web 33. Web 33 is perforated by apertures 34 so as to allow the passage of skirt inflation air between the stages. Air flow through the apertures 34 may be controlled by flap valves 35.

Alternatively, the apertures 34 may be dispensed with and upper stage 30 inflated independently of lower stage 31, using air discharged through a duct 36.

As another alternative, upper stage 30 may be filled wholly or partially with resilient material, so as to function primarily as a buffer.

It will be appreciated that the invention can be applied to rear flexible skirt systems, thus, for example, replacing skirt system 9 (FIG. 1), or to peripheral skirt systems.

FIG. 5 illustrates an air-cushion vehicle 40 provided with a peripheral skirt system 8b extending around the whole periphery of vehicle body 41. Cushion air is provided by a fan/engine unit 42/43 disposed in a central duct 44 extending downwardly through the body 41. Skirt inflation air is provided by duct tappings or branches 45 and is raised slightly above cushion pressure by booster fan units 46 disposed in the tappings.

In the case of FIG. 6, a flexible wall or skirt member 50, (of the form described in above-mentioned British patent specification No. 1,043,351), is disposed over the front end of each loop 23c. The contiguous flexible skirt members 50 each comprise a sheet of flexible material folded over to provide the member with an outer portion 50a flanked by a pair of side or tie portions 50b, which extend inwardly from the outer portion towards the cushion 3. The skirt members 50 are inflated by air discharged through tappings 51 of fans 12, raised slightly in pressure by booster fan units 52. The inner parts, i.e. corners, of the side portions 50b of the skirt members 50 are preferably attached, (as illustrated), to intermediate points 53 along the associated members 20c.

The arrangement results in a slightly pressurized space between each skirt member 50 and its associated loop 23c, the pressure being sensitive to changes in the water surface 2 beneath. The pressurized space serves to reduce the escape of air from the cushion 3, rather as a second stage of a labyrinth seal, wherein the small plenum gap beneath the loops 23c serves as the first stage thereof.

The space can also serve as an effective spray barrier. Although the bottoms of the members 50 tend to be in contact with the water surface 2, wear of the members due to "buckling" is reduced, compared with members 50 used per se. This is because wave forces tend to press the members 50 against the loops 23c whereby "buckling" of the members 50 is suppressed.

Figure 7:
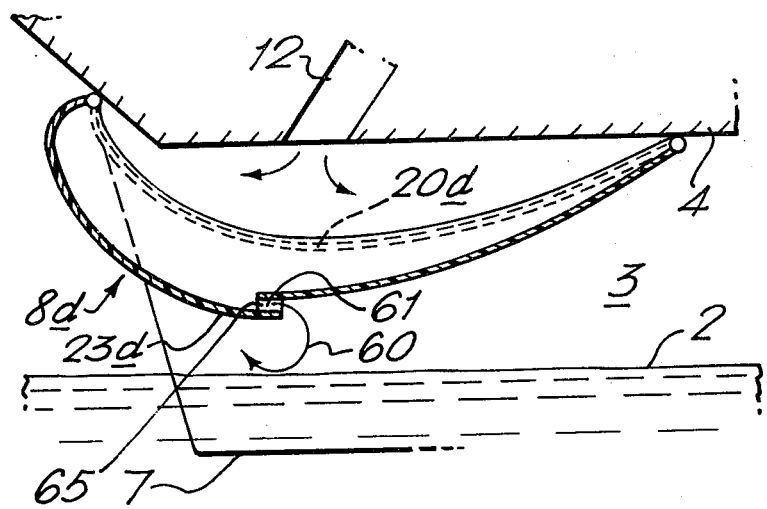

FIG. 7 illustrates a two-stage cushion seal wherein the upper stage comprises the flexible skirt system 8d and the lower stage air curtains 60 formed by skirt inflation air discharged through nozzles 61 formed in the bottoms of loops 23d. Rigid spacers 65 attached to and extending between loop portions form the nozzles 61. In this arrangement, the curvatures of the loops 23d are not discontinuous, in the longitudinal sense.

Figure 8:
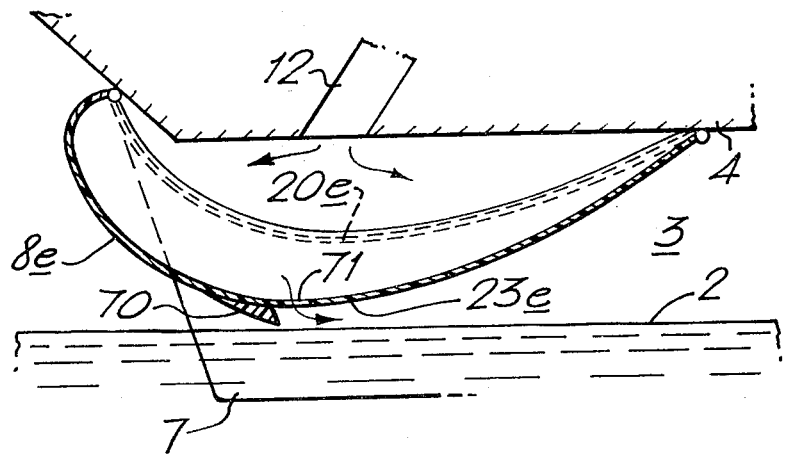

FIG. 8 illustrates a flexible skirt system 8e with flow-breaker members 70 of resilient material attached to the bottoms of loops 23e.

The members 70 serve to reduce any tendency of the undulating water surface to cling to the loop surfaces.

The skirt system 9e is also provided with drain holes 71 formed in the bottoms of the loops 23e.

We claim:

1. A fluid-cushion supported apparatus provided with an inflatable flexible skirt system, the system comprising: a row of filamentary support members disposed in laterally spaced relationship, with end portions attached to the apparatus; and, flexible sheet materials supported by and depending from the support members so as to form interconnected loops each of which hangs downwardly between the filamentary support members, the loops also being curved longitudinally between the end portions of the filamentary support members.

2. Apparatus as claimed in claim 1, wherein the curvature of the loops, between the end portions of the support members, is substantially discontinuous.

3. Apparatus as claimed in claim 1, wherein the bottoms of the loops form plenum gaps through which an atmosphere-seeking flow of cushion fluid takes place, said loop bottoms being provided with a multiplicity of bleed holes whereby inflation fluid can escape to suppress any tendency for local pressure changes to take place as a result of the Bernoulli effect.

4. Apparatus as claimed in claim 1, wherein the flexible skirt system is of two-stage form, comprising an upper stage and a lower stage.

5. Apparatus as claimed in claim 4, further comprising means for passing skirt inflation fluid between the stages.

6. Apparatus as claimed in claim 4, further comprising means for inflating the upper stage independently of the lower stage.

7. Apparatus as claimed in claim 1, wherein the bottoms of the loops carry nozzles from which skirt inflation fluid is discharged to form fluid curtains extending between the loop bottoms and the reactive surface.

8. Apparatus as claimed in claim 1, wherein a flexible skirt member is disposed over the front end of each loop, each flexible skirt member comprising a sheet of flexible material folded over to provide the member with an outer portion flanked by a pair of side portions, which extend inwardly from the outer portion towards the fluid cushion of the apparatus.

9. Apparatus as claimed in claim 8, wherein inner parts of the side portions of the flexible skirt members are attached to the filamentary support members.

10. Apparatus as claimed in claim 1, further comprising a pair of laterally-spaced wall structures extending longitudinally along the sides of a vehicle body in substantially parallel array and depending therefrom so as to dip into water, over which the vehicle is thereby adapted to travel and form part of a cushion-gas seal, said flexible skirt system being incorporated in the vehicle to contain cushion gas at least at one end of the cushion.

11. Apparatus as claimed in claim 1, wherein said flexible skirt system extends around the whole periphery of the apparatus.

* * * * *

UNITED STATES PATENT AND TRADEMARK OFFICE
CERTIFICATE OF CORRECTION

PATENT NO. : 4,428,448

DATED : January 31, 1984

INVENTOR(S) : Tattersall et al.

It is certified that error appears in the above-identified patent and that said Letters Patent is hereby corrected as shown below:

Col. 1, Line 19, "3.420,330" should be --3,420,330--.

Signed and Sealed this

Eighth Day of January 1985

[SEAL]

Attest:

*Attesting Officer*

GERALD J. MOSSINGHOFF

*Commissioner of Patents and Trademarks*